United States Patent
Zakharov et al.

(10) Patent No.: US 6,499,286 B1
(45) Date of Patent: Dec. 31, 2002

(54) METHOD FOR THE OPERATION OF A SUPERSONIC JET-ENGINE COMBINED POWER UNIT

(76) Inventors: Evgeny Nikolaevich Zakharov, kv.127, d.15, korp. 3, ul. Starobitsevskaya, Moscow, 113628 (RU); Genya Tyo, kv.4, d.14, per. Ogorodnaya Sloboda, Moscow, 101000 (RU)

( * ) Notice: Subject to any disclaimer, the term of this patent is extended or adjusted under 35 U.S.C. 154(b) by 0 days.

(21) Appl. No.: 09/282,759

(22) Filed: Mar. 31, 1999

Related U.S. Application Data

(63) Continuation-in-part of application No. PCT/RU97/00329, filed on Oct. 6, 1997.

(30) Foreign Application Priority Data

Oct. 4, 1996 (RU) .............................................. 96120469

(51) Int. Cl.$^7$ ................................................ B63H 11/00
(52) U.S. Cl. ......................... 60/204; 60/261; 60/270.1; 60/269
(58) Field of Search ....................... 60/204, 261, 270.1, 60/269

(56) References Cited

U.S. PATENT DOCUMENTS

| | | | |
|---|---|---|---|
| 3,574,997 A | | 4/1971 | Syrovy ........................... 60/13 |
| 4,996,839 A | * | 3/1991 | Wilkinson et al. ............. 60/247 |
| 5,050,384 A | * | 9/1991 | Crockett .................... 60/605.1 |
| 5,074,118 A | * | 12/1991 | Kepler ......................... 60/224 |
| 5,471,834 A | | 12/1995 | Kapich ......................... 60/269 |
| 5,692,372 A | * | 12/1997 | Whurr ....................... 60/226.1 |

FOREIGN PATENT DOCUMENTS

| | | |
|---|---|---|
| GB | 2 301 632 A | 12/1996 |
| RU | SU 83140 | 2/1966 |

OTHER PUBLICATIONS

Judge, Arthur. Gas Turbines For Aircraft, London, Chapman &Hall Ltd., 1958.*
Kurziner, R.I. *Jet Engines for High Supersonic Flight Speeds*, Moscow (1977), p. 141.
Inozemtsev N.V., Nuez V.S., Aircraft Gas Turbine Engines, State Publishing House of Defense Industry, Moscow (1949) p. 50 & 55.

* cited by examiner

Primary Examiner—Charles G. Freay
Assistant Examiner—W Rodriguez
(74) Attorney, Agent, or Firm—Graybeal Jackson Haley LLP

(57) ABSTRACT

A method for operating a supersonic hybrid jet power plant during various flight operations. The power plant includes a jet engine and a reciprocating internal combustion engine, the jet engine having a housing defining an inlet for receiving air, an afterburner section, and a nozzle for expelling air and combustion byproducts. The reciprocating internal combustion engine is disposed in the housing, has an intake manifold located at the inlet, and is operatively coupled to a fan rotationally mounted adjacent to the afterburner section of the jet engine. The fan is preferably operated during subsonic flight operations to boost air pressure to the afterburner. In this manner, suitable air flow at the inlet is maintained with the assistance of the reciprocating internal combustion engine during subsonic flight operations, but assistance is reduced or eliminated during supersonic flight operations so that a pressure build-up ratio of close to one is maintained.

8 Claims, 1 Drawing Sheet

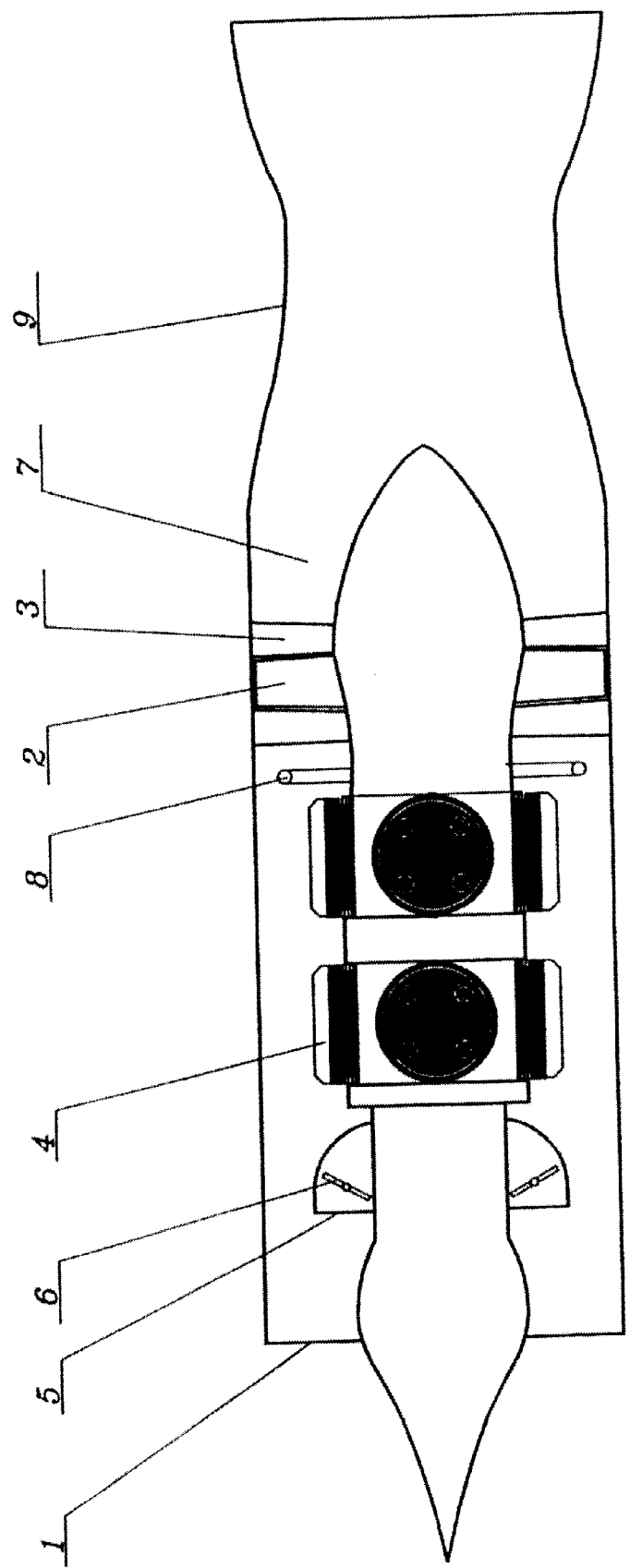

METHOD FOR THE OPERATION OF A SUPERSONIC JET-ENGINE COMBINED POWER UNIT

This application is a continuation-in-part of PCT/RU97/00329 filed Oct. 6, 1997.

FIELD OF THE INVENTION

The present invention relates to mechanical engineering, particularly, to designing engines, and more particularly, to a method for operating supersonic power plants for aircraft.

BACKGROUND OF THE INVENTION

A method of operating a supersonic jet power plant, including dynamically compressing air in an inlet, feeding the pressurized air into a combustor, promoting turbulence in and adding heat to the air, and expanding combustion products in a jet nozzle is known in the prior art. See Inozemtsev N.V., Aircraft Gas Turbine Engines, Moscow, State Publishing House of Defense Industry, 1949, page 50.

The problems with the prior art method of operating a ramjet engine include its low efficiency at subsonic flight speeds, insufficient dynamics of the flight speed modulation and considerable hydraulic-pressure losses caused by great extension of the engine.

Another conventional method of operating a supersonic jet power plant comprising a turbojet, includes dynamically compressing air in an inlet, boosting the total air by a compressor which is rotationally driven by the engine, feeding the pressurized air into a combustion chamber and adding heat to the air, and expanding combustion products in the driving engine and a jet nozzle (Inozemtsev N.V. Aircraft Gas Turbine Engines, Moscow, State Publishing House of Defense Industry, 194, page 55).

Disadvantages of the prior art method include low efficiency of the power plant at Mach numbers under 1 and above 3 and insufficient dynamics when it is required to change drastically the flight speed.

Also known is a method of operating a supersonic hybrid jet power plant comprising a ducted turbojet and a ramjet, including dynamically compressing air in an inlet, boosting the air by a fan which is rotationally driven by an engine, feeding the pressurized air into a combustor, providing turbulence in and adding heat to the air, and expanding combustion products in a jet nozzle, wherein a portion of the pressurized air is fed to an intake manifold of the driving engine (Kurziner R.I. Jet Engines for High Supersonic Flight Speeds, Moscow, Mashinostroyenie, 1977, page 141).

The above referenced most pertinent prior art suffers low efficiency of the power plant at subsonic flight speeds, caused by inferior turbogenerator efficiency, and low dynamics of a vehicle both at subsonic and supersonic flight speeds.

SUMMARY OF THE INVENTION

It is an object of the present invention to improve efficiency of both a power plant and an aircraft, and to provide superior vehicle dynamics, thereby enhancing the aircraft reliability and flight safety.

The above object is attained in a method of operating a supersonic hybrid jet power plant, including dynamically compressing air in an inlet, boosting the air by a fan which is rotationally driven by an engine equipped with an intake manifold, feeding the pressurized air into a combustor, promoting turbulence in and supplying heat to the air, and expanding combustion products in a jet nozzle, a portion of the pressurized air being fed to the intake manifold of the driving engine, wherein the driving engine is a reciprocating two-stroke engine, a power supplied to the fan being reduced at supersonic flight regime, while maintaining the fan pressure ratio close to one.

To achieve the object of the invention, the heat addition to the pressurized air in the combustor is cut-off at subsonic flight regime.

The turbulence may be promoted in the pressurized air by the fan, turbulence conditions being varied by adjusting the rotation speed of the fan.

Alternatively, the turbulence may be promoted in the pressurized air by straightener blades of the fan, turbulence conditions being varied by adjusting an incidence angle of the straightener blades.

The power supplied to the fan may be reduced by throttling the intake manifold of the engine.

BRIEF DESCRIPTION OF THE DRAWING

The drawing presents a schematic diagram of a power plant for implementing the method in accordance with the invention.

DESCRIPTION OF THE PREFERRED EMBODIMENT

Referring to the drawing in detail, a power plant comprises an inlet 1 in the form of a supersonic intake, a fan 2 which may be a multistage fan having straightener blades 3, a reciprocating two-stroke engine 4 having a shaft connected to the fan 2, an intake manifold 5 of the engine equipped with a throttle blade 6, a combustor 7 with fuel supply means 8, and a jet nozzle 9.

A method in accordance with the invention is realized in the power plant in the following manner. In flight, an air charge is compressed in the inlet 1, boosted by the fan 2 which is rotated by the reciprocating engine 4, a portion of the pressurized air being fed to the intake manifold 5 to provide a thermodynamic process in the engine. Most of the air which was pressurized and turbulized by the fan 2 is fed into a combustor 7, and at take-off and breaking flight regimes heat is added to the air, for instance, by injecting and burning fuel therein. Combustion products are further expanded in the jet nozzle 9 to generate an exhaust thrust.

At take-off and subsonic flight, a shaft of the reciprocating engine 4 operates at its rated power to provide the highest pressure ratio generated by the fan 2.

The pressure ratio in the inlet 1 increases with the flight speed, and to maintain an optimum pressure ratio in the power plant and restrict the temperature of gases in the combustor 7, the power of the reciprocating engine 4 is reduced, for instance, by restricting the pressurized air flow into the inlet manifold 5 by the throttle blade 6, thereby switching the power plant operation from the engine-compression mode to the ramjet mode. Herein, as opposed to the autorotation mode known from the most pertinent prior art, the maintenance of the pressure ratio close to one by the fan 2 does not generate resistance to the motion of the air pressurized in the inlet, only minor engine power being consumed to drive the fan 2. It should be noted that the use of a gas turbine as the driving engine to implement the method in accordance with invention will not provide an-acceptable efficiency of the power plant in view of its narrow range of steady and efficient operation. Further, the use of reciprocating engine superior acceleration capability within a wide operation range essentially improves dynamics of the ramjet owing to the possibility to increase drastically the pressure ratio by the fan 2. In this case, the pressure increase at the combustor 7 inlet at a sharp change in the flight conditions will prevent the surge which occurs in a ramjet in such case.

The reciprocating engine superior efficiency also provides the attainment of unique efficiency of aircraft at subsonic flight through switching the power plant to the ultrahigh-bypass fan engine mode by cutting-off the fuel supply to the combustor 7. Such operating conditions are necessary, for example, in the air standing patrol of special means or when the power plant is used in commercial aircraft.

The possibility of using the fan 2 and the straightener blades 3 to promote turbulence in an air charge enables the essential reduction in the length of the combustor 7, while providing the complete combustion of the charge therein.

Consequently, the present invention ensures maximum efficiency of aircraft at all flight regimes from take-off to hypersonic flight, and improves flight reliability and safety owing both to the considerably improved aircraft dynamics and simple design of a reciprocating engine.

What is claimed is:

1. A method of operating a supersonic hybrid jet power plant wherein the hybrid power plant comprises a jet engine and a reciprocating internal combustion engine, the jet engine having a housing defining an inlet for receiving air, a combustor, and a nozzle for expelling air and combustion byproducts wherein the reciprocating internal combustion engine is disposed in the housing, has an intake manifold located at the inlet, and is operatively coupled to a fan rotationally mounted adjacent to the combustor, the method comprising:

dynamically compressing air at the inlet;
   actively pressurizing air by operating the fan;
   feeding the pressurized air into the combustor;
   promoting turbulence in and adding heat to the air when operating during supersonic flight;
   expanding combustion products in the nozzle; and
   directing a portion of the dynamically compressed air to the intake manifold of the reciprocating internal combustion engine,
   wherein power supplied to the fan by the reciprocating internal combustion engine is reduced during supersonic flight to maintain a fan pressure ratio of one.

2. The method as set forth in claim 1 wherein the turbulence is promoted in the pressurized air by the fan, and turbulence conditions are varied by adjusting the fan rotation speed.

3. The method as set forth in claim 1 wherein the turbulence is promoted in the pressurized air by straightening blades, turbulence conditions being varied by adjusting an incidence angle of the straightening blades.

4. The method as set forth in claim 1 wherein the power supplied to the fan is changed by modifying the airflow through, the intake manifold of the reciprocating internal combustion engine.

5. The method as set forth in claim 1 wherein the heat addition to the pressurized air is cut-off during subsonic flight.

6. The method as set forth in claim 1 wherein the turbulence is promoted in the pressurized air by the fan, and turbulence conditions are varied by adjusting the fan rotation speed.

7. The method as set forth in claim 1 wherein the power supplied to the fan is changed by modifying the airflow through the intake manifold of the reciprocating internal combustion engine.

8. A method of operating a supersonic hybrid jet power plant wherein the hybrid power plant comprises a jet engine and a reciprocating internal combustion engine, the jet engine having a housing defining an inlet for receiving air, a combustor, and a nozzle for expelling air and combustion byproducts wherein the reciprocating internal combustion engine is disposed in the housing, has an intake manifold located at the inlet, and is operatively coupled to a fan rotationally mounted adjacent to the combustor, the method comprising:

dynamically compressing air at the inlet;
   actively pressurizing air by operating the fan;
   feeding the pressurized air into the combustor;
   promoting turbulence in and adding heat to the air wherein the turbulence is promoted in the pressurized air by straightening blades, turbulence conditions being varied by adjusting an incidence angle of the straightening blades;
   expanding combustion products in the nozzle; and
   directing a portion of the dynamically compressed air to the intake manifold of the reciprocating internal combustion engine,
   wherein power supplied to the fan by the reciprocating internal combustion engine is reduced during supersonic flight to maintain a fan pressure ratio of one.

* * * * *